June 23, 1964 P. DREYER ETAL 3,138,311

FILM FEEDING AND HOLDING DEVICE

Filed Feb. 4, 1963

INVENTORS
Paul Dreyer
Kaare Hemsen
Gunnar Wasserfall

BY
Finnie, Edmonds, Morton, Taylor & Adams
ATTORNEYS

United States Patent Office 3,138,311
Patented June 23, 1964

3,138,311
FILM FEEDING AND HOLDING DEVICE
Paul Dreyer, Hannasdalsgate 51, Stavanger, Norway, and Kaare Hemsen, Bekkestua, near Oslo, and Gunnar Wasserfall, Oslo, Norway, assignors to said Dreyer
Filed Feb. 4, 1963, Ser. No. 255,873
10 Claims. (Cl. 226—57)

The present invention relates to a feeding and holder device for films, especially in apparatus used together with composing machines in which the matter composed becomes photographed; in this specification the term "composed matter" means a coordination of letter holders so arranged that the entire or part of a line formed thereby may be photographed.

In feeding and holder devices for use in this connection and where the film is stepped one step for each line composed and which is to be photographed, it is of advantage to be able to adjust the film length fed in each step, and the invention primarily aims at providing an adjusting mechanism which in a simple and exact manner controls the movement of the slide of the feeding device.

According to the invention this is achieved thereby that the slide is provided with a shaft carrying a great number of cams, where at least one of said cams is so shaped that upon its rotation the cam displaces the slide when the cam abuts against a stationary member and further, according to the invention, said stationary member is adjustable, so that the displacement distance of the slide, at each revolution of said cam, may be adjusted.

Said rotatable shaft is also provided with a number of other cams, serving different purposes, inter alia control of a dog driver mechanism, control of a clamping plate which brings the film to the correct plane for photographing, ignition of blitz, control of the shutter of the camera, etc.

The invention thus relates to a feeding and holder device for films to be used in composing machines in which the matter composed is photographed, comprising a movable slide carrying a dog driver device and a clamping device for arresting the film during photographing thereof, said slide being provided with a rotatable shaft, preferably driven by a motor supported by the slide and provided with a series of cams or lug discs which control the movements of the slide, dog driver devices for moving the film, ignition of blitz, clamping of the film in correct position during the photographing operation, etc., and the invention is primarily characterized thereby that a cam, preferably the central cam on the shaft, is adapted by its rotation to engage a stationary but adjustable abutment, whereby moving of the slide is caused through the cooperation between said cam and the abutment.

Other and important features and details of the present invention will be elucidated by the following description, with reference to the drawing, in which.

Figure 1:
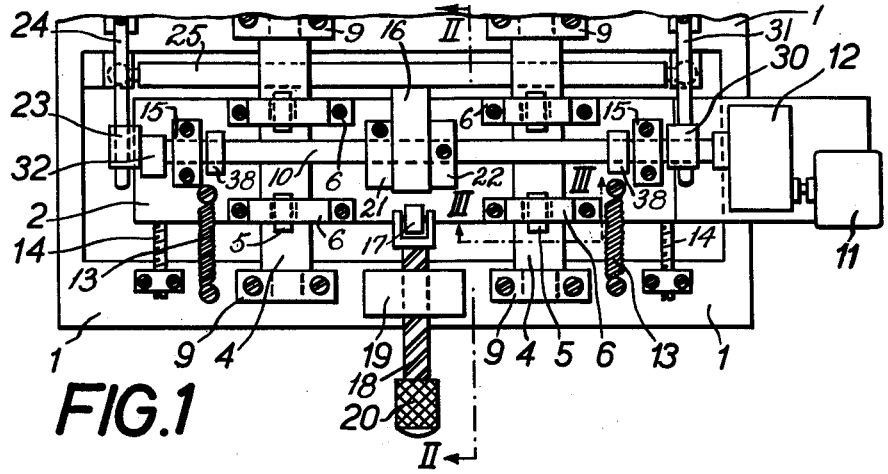
FIG. 1 is a view of a feeding and holder device according to the invention, as seen from above.
Figure 3:
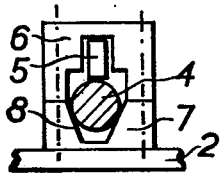
FIG. 3 shows a preferred embodiment of the mounting of the slide of the feeding device in a main frame.

The feeding and holder device of FIG. 1 comprises a main frame 1 carrying a slide 2 which (FIG. 3) is supported upon spaced guides 4 by means of rollers 5 supported in brackets 6 arranged on the slide 2. Said bracket may comprise a further member 7 having a V-shaped groove 8 which receives the lower part of the rod-shaped guide 4. Those parts which (on FIG. 3) slide along or roll upon each other may be tempered or machined so that only slight wear occurs. In the embodiment shown the ends of the guides 4 are attached to respective opposite sides of the main frame by means of suitable brackets 9.

Figure 2:
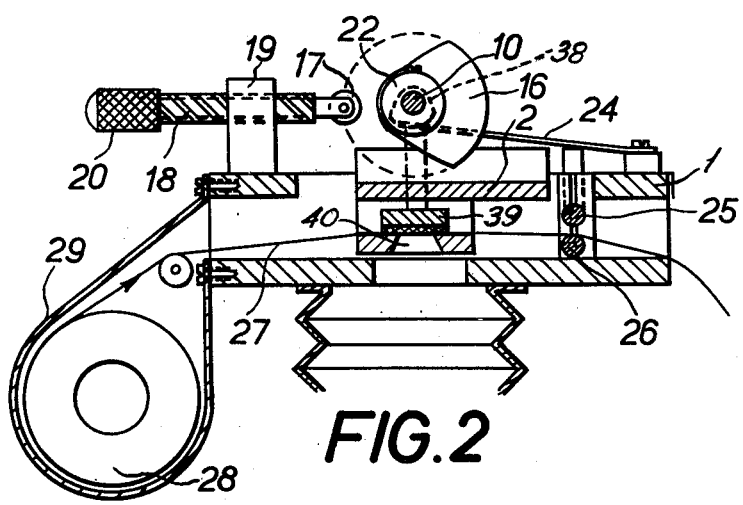
FIG. 2 shows a section taken along the line II—II of FIG. 1.

The slide 2 is provided with a rotable shaft 10 and said shaft is in the embodiment shown driven by a motor 11 through a suitable reduction gear 12; both motor and reduction gear are supported by the slide and accompany the movements thereof. The slide 2 is maintained in one of its end positions by means of springs 13 which pull the slide to contact with adjustable screw-formed abutments 14. The shaft 10 is supported by bearings 15 and is provided with a series of cams which rotate together with said shaft. In the embodiment illustrated the central cam 16 forms a main cam for displacing the slide forwards, which means upwards on FIG. 1. Upon its rotation the cam 16 (see FIG. 2) contacts a roller 17 rotatably mounted at one end of a screw 18, and the cam 16 then displaces the slide 2 to the right, as seen on FIG. 2. When the top of the cam has passed by the roller 17, the slide 2 is retracted by means of the springs 13 (see FIG. 1) and the slide again contacts the screws 14. The extent of the desired displacement of the slide 2 is adjusted by means of the screw 18, which is threaded through a support 19 and may be moved towards the right or the left (FIG. 2) by means of its knurled head 20. At the respective sides of the cam 16 are, in the embodiment shown, arranged discs 21 and 22, which are respectively adapted to control blitz or other light for the photographing and to control the shutter of the camera. The shaft 10 further carries, reckoned from the left of FIG. 1, a cam 23 adapted to operate an arm 24 one end of which is fixed relative to the main frame 1 (FIG. 2), which arm 24 controls one end of a non-rotatable clamping bar 25 which cooperates with a rotatable roller 26 when film 27 is to be maintained stationary during the displacement of the slide, so that the film will not wind up due to the tension in the film roll 28 situated in the casing 29. When the slide is moved the cam 23 may slide upon the arm 24 until the slide engages the screws 14. A corresponding control mechanism is provided at the right end (FIG. 1) of the shaft 10, where a cam 30 cooperates with an arm 31 which corresponds to the arm 24. The arm 31 actuates the right end of the clamping bar 25. As shown in FIG. 2, one end of each of the arms 24 and 31 is attached to the main frame 1 and the roller 26, over which the film 27 moves, together with the clamping bar 25 are mounted on the main frame.

Figure 4:
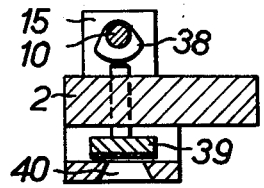
FIG. 4 illustrates a clamping plate and the control thereof.
Figure 5:
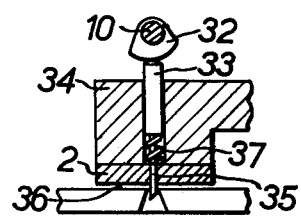
FIG. 5 illustrates a preferred form of the perforating dog driver mechanism for feeding of film.

Inwardly of the cam 23 the shaft 10 carries a further cam 32 (see FIG. 5). When the shaft 10 rotates the cam 32 engages a stud 33 which is axially displaceable in a block 34 upon the slide 2, and said stud 33 is at its lower end provided with a pointed end portion 35 which, when the stud 33 is actuated by the cam 32, penetrates the film, which is situated within the slot 36 in the slide 2 during the operation of the device. A helical spring 37 pushes said pointed end portion 35 and the stud 33 backwards upon further rotation of the shaft 10 and the cam 32. The operation of the cam 32 and the angular position thereof in relation to the cam 16, are such that the cam first causes the point 35 to perforate the film whereafter the cam 16, when rotated further, contacts the roller 17 and displaces the slide 2, whereby the film is pulled towards the right (FIG. 2). When the slide has arrived at its outermost adjusted position, two other cams 38 provided upon the shaft 10 will act upon a pressure plate 39 (see FIG. 4). Said pressure plate 39 is movably supported in the slide 2 above the film 27 and over an opening 40 through which the film is exposed. The cams 38 are located on the shaft 10 in such an angular position relative to cams 16 and 32 that they will press the plate 39 downwards and maintain the film plane and in correct position for the photographic operation. Upon further rotation of the parts described above the perforating point 35 is pulled out from the film, the pressure plate 39 is released and the non-rotatable clamping bar 25 is, by means of the cams 23 and 30, maintained in contact with the film 27 on the roller 26 so that the film is not displaced in an undesired manner, and upon continued rotation of the cam 16 past the roller 17, the slide 2 will move backwards to the position shown on FIG. 1, whereafter the described succession of operations is repeated.

The example described only serves to illustrate the invention but does not in any way limit the same. Other embodiments are well conceivable; e.g. the slide 2 may be supported in a manner different from that shown on FIG. 3, and a feeding mechanism different from that of FIG. 5 may be made use of.

We claim:

1. In a film feeding and holding device for use with composing machines in which the matter composed is photographed, said film feeding and holding device being of the type comprising a main frame, a slide mounted on the frame for forward and backward movement in the direction of motion of the film, a dog type film driver device mounted on the slide, a film clamping device mounted on the slide for arresting movement of the film during photographing, a rotatable shaft mounted on the slide, means for rotating the shaft, a plurality of cams mounted on the shaft for rotation therewith including cams for respectively controlling the movements of the slide, the dog film driver device for moving the film and the film clamping device, and a stationary adjustable abutment located on the frame opposite the cam for controlling the movement of the slide, said cam being adapted upon rotation of said shaft to engage said abutment and effect movement of the slide in at least one direction.

2. A film feeding and holding device as claimed in claim 1, characterized in that said abutment comprises a bracket mounted on the main frame, a screw threaded through said bracket, and a rotatable roller mounted on the end of the screw opposite the position of the cam for controlling the movement of the slide, said screw being adapted to adjust the position of the roller with respect to said cam for determining the extent of the translation of the slide and the extent to which the film is moved thereby.

3. A film feeding and holding device as claimed in claim 1, characterized in that the dog film driver comprises at least one axially displaceable film-perforating member actuated by one of the cams on the rotatable shaft, which cam is located in an angular position relative to the cam for moving the slide such that the perforating member perforates the film and moves the film along when the slide is moved in the direction of desired movement of the film.

4. A film feeding and holding device as claimed in claim 1, characterized in that the film clamping device comprises a clamping plate for clamping the film in a flat condition at an exposure location, the cam on said rotatable shaft for actuating the film clamping device being located at an angular position relative to that of the slide actuating cam such that the clamping plate presses the film to a flat condition at a selected exposure location.

5. A film feeding and holding device as claimed in claim 1, characterized by including a film locking mechanism carried by the main frame for holding the film against movement from the position to which it had been advanced prior to backward movement of the slide.

6. A film feeding and holding device as claimed in claim 5, characterized in that said locking mechanism comprises a rotatable roller over which the film runs, a non-rotatable locking member located above the film and said rotatable roller, resilient arms at the respective ends of said locking member for moving said member toward the rotatable roller and into locking engagement with the film, and cams on said rotatable shaft rotatable therewith for respectively acting on said resilient arms to move the locking member into engagement with the film on the rotatable roller.

7. A film feeding and holding device as claimed in claim 1, characterized by including spaced hardened guide members mounted on the main frame for slidably supporting the slide, and spaced rollers carried by the slide engaging each guide.

8. In a film feeding and holding device for use with composing machines in which the matter composed is photographed, said film feeding and holding device being of the type comprising a main frame, a slide mounted on the frame for forward and backward movement in the direction of motion of the film, a film advancing mechanism mounted on the slide, a clamping device mounted on the slide for arresting movement of the film during exposure thereof, a rotatable shaft mounted on the slide, means for rotating the shaft, a plurality of cams mounted on the shaft for rotation therewith including cams for respectively controlling the movements of the slide, the mechanism for advancing the film and the film clamping device, a stationary abutment located on the frame opposite the cam controlling the movement of the slide, said cam being adapted upon rotation of said shaft to engage said abutment and effect movement of the slide in at least one direction, and spring means between the main frame and the slide for moving the slide in a direction opposite to that effected by said cam.

9. A film feeding and holding device as claimed in claim 8, characterized by including spaced adjustable abutments mounted on the main frame and engaged by the slide in one of its extreme positions for adjusting the position of the slide with respect to the main frame.

10. A film feeding and holding device as claimed in claim 9, characterized in that each of said adjustable abutments comprises a screw threadably engaged in a bracket attached to the main frame.

References Cited in the file of this patent
UNITED STATES PATENTS

| | | |
|---|---|---|
| 1,574,687 | Pillsbury | Feb. 23, 1926 |
| 1,776,330 | Swars | Sept. 23, 1930 |
| 2,468,620 | Gilbert et al. | Apr. 26, 1949 |

FOREIGN PATENTS

| | | |
|---|---|---|
| 841,049 | Great Britain | July 13, 1960 |